Nov. 4, 1969  J. A. MACK  3,476,867
HANDHOLE FOR ELECTRICAL APPARATUS ADAPTED
FOR EASY KNOCKDOWN AND REASSEMBLY
Filed April 22, 1968  3 Sheets-Sheet 1

JULES A. MACK  INVENTOR.

BY

JULES A. MACK INVENTOR.

BY Roy B. Morfin

JULES A. MACK INVENTOR.

BY Roy B. Morris

United States Patent Office 3,476,867
Patented Nov. 4, 1969

3,476,867
HANDHOLE FOR ELECTRICAL APPARATUS ADAPTED FOR EASY KNOCKDOWN AND REASSEMBLY
Jules A. Mack, Conover, N.C., assignor to Superior Continental Corporation, Hickory, N.C., a corporation of Delaware
Filed Apr. 22, 1968, Ser. No. 722,895
Int. Cl. H02g 9/10
U.S. Cl. 174—37                                             4 Claims

ABSTRACT OF THE DISCLOSURE

Disclosed herein is a handhole, which is essentially a box adapted for containing electrical apparatus while both box and the apparatus are buried in the ground during service. The instant handhole is a weather resisting container adapted for ready assembly and disassembly by a sole workman, this knockdown feature being advantageous in that it facilitates shipment from place to place with a minimum of occupied volume. Making up the five-sided handhole are two end walls possessing tab-like protrusions adapted to be engagingly received by elongated apertures in the longer leg of two L-shaped side walls and a top having an engaging means adapted to lock underneath the shorter leg of the L-shaped side wall. To give rigidity and structural strength to the entire combination, U-shaped spacer bars with an aperture therein are engaged underneath a head portion and on to a shank part of a stub, an integral part of the stub being fixedly attached to the longer legs of the side walls and in mirror-like juxtaposition in opposing side walls. In service, a weatherproof splice case having at least two insulated electrical conductors that are in electrical and mechanical connection therein, is placed on the spacer bars with the insulated electrical conductors being lead out an open bottom of the handhole.

INTRODUCTION

In the past, most telephone transmission lines were installed above ground; however, there is now a strong trend to place such transmission lines beneath grade, i.e. underground. At first blush, such a trend would appear to present few, if any, problems. But, unfortunately this has not been the case. Aside from a multitude of problems such as corrosive attack by electrolysis, and attack by rodents and the ever present water and water vapor, there is a problem of where, how, and what apparatus can be used to house splice cases containing two or more telephone transmission lines spliced one to another. Some kind of apparatus that is economical, easily transported, and structurally suitable must be designed for housing transmission line splice cases underground. As a general rule, splices joining one transmission line to another, for one purpose or another, are themselves housed in a waterproof plastic case called a splice case, and, in turn, the splice case must be placed in the ground and housed in a manner that the case is easily accessible from the surface and protected as much as possible from those corrosive elements found underground. To this end, the instant invention is directed.

DETAILED DESCRIPTION OF THE INVENTION

Figure 1:
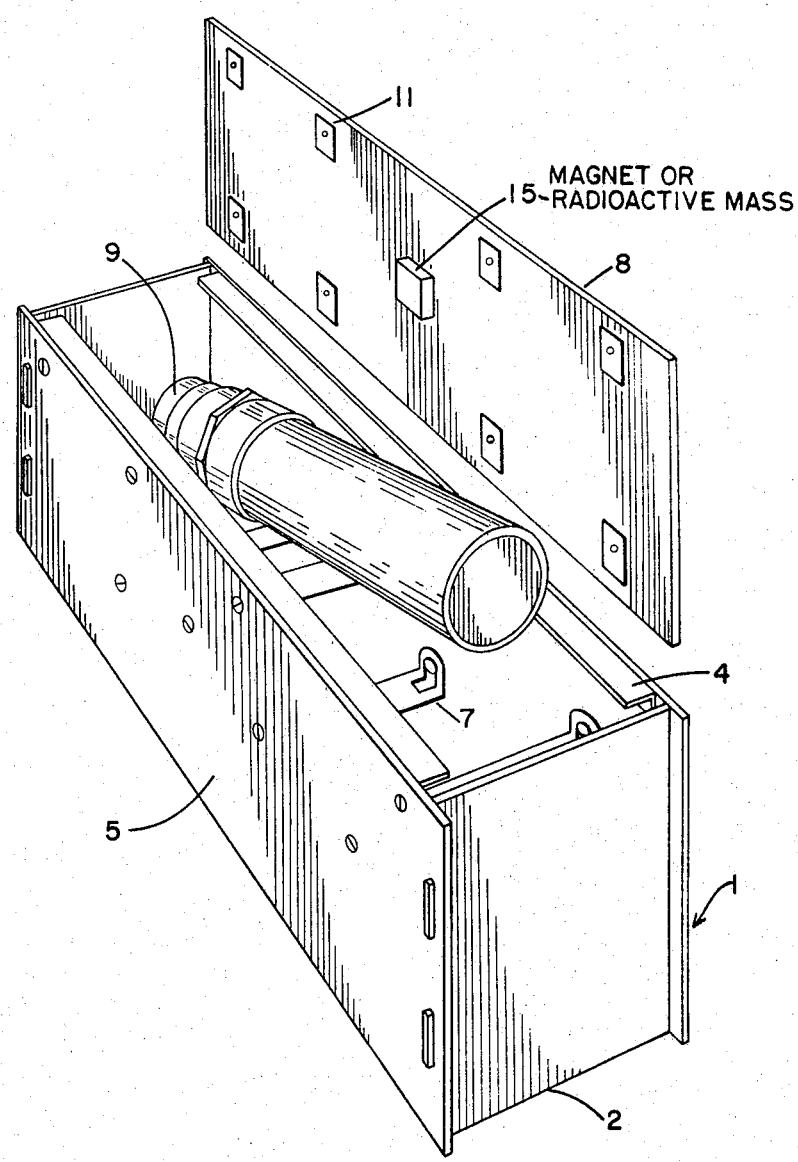
FIGURE 1 is a prospective view of an assembled handhole, or handvault as it is called in Australia, with a splice case being shown partly removed from the handhole itself.

Handholes or handvaults belonging to the same family as that shown in FIGURE 1, are commonly adapted to lie just beneath the soil or flush with the soil surface. Basically and primarily, a handhole is a construction that is used to maintain an opening in the ground. The handhole indicated generally at 1 in FIGURE 1, is shown housing a splice case 9 partly in and partly removed from an in-service position, i.e. lying on and supported by the spacer bars 7. The handhole 1 is basically constructed of five components, i.e. two end walls 2, two L-shaped side walls, and a top. These elements in assembled combination result in a configuration like unto an open-bottom box.

Figure 3:
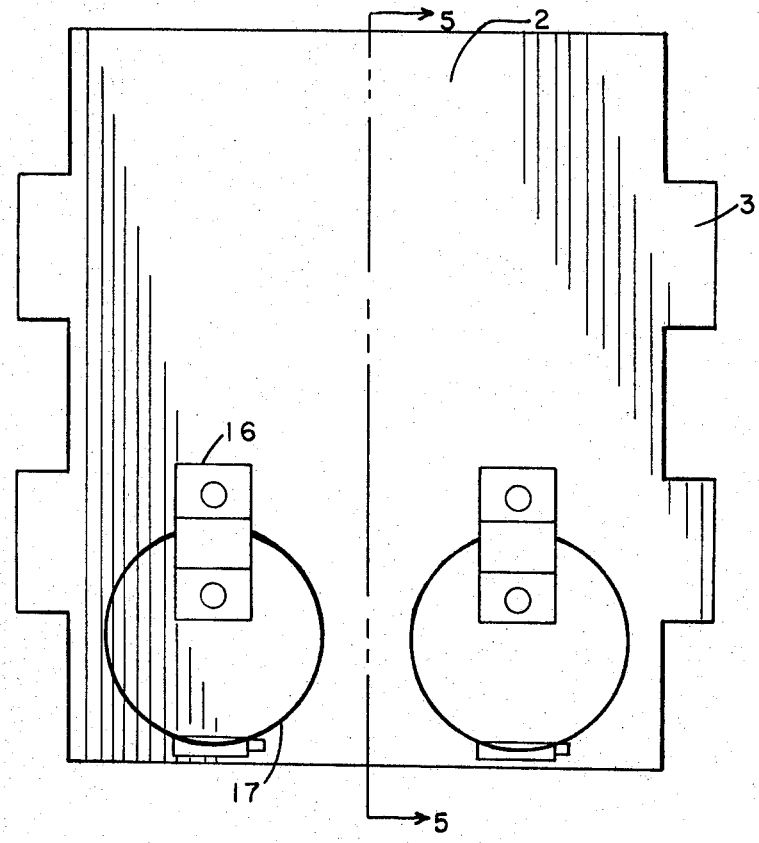
FIGURE 3 is an elevation view of an end wall showing the tabs and adjustable clamps attached to the end walls.

A basic feature of the instant invention is ease of assembly and disassembly of the handhole. Shown at 2 in FIGURES 1 and 3 are the end walls, each of which are glass fiber reinforced resin sheet material in a rectangular shape with taps or ears 3 protruding from one terminal edge of the end walls. Of the same height as the end walls, but of any predetermined length, are the longer legs of the L-shaped side walls shown at 5 in FIGURE 1. The shorter leg 4 can be either an angle or a rectangle attached to the element 5. It also can be molded integral with leg 5 for that manner. In the terminal portions of the side walls' longer legs 5, there are elongated apertures that are so positioned and of a particular size so that they can engagingly receive the tab members 3 of the end walls 2. If the handhole's basic construction were such that it depended solely for physical assembled strength on only the tab-elongated aperture receiving relationship, the stability and rigidity of the handhole would be so low as to render it inoperable for practical purposes. Therefore, to achieve structural stability and rigidity that will withstand the dynamic and/or static impact of a large truck and at the same time maintain the knockdown characteristic, i.e. ease of disassembly, U-shaped spacer bars are used.

Figure 2:
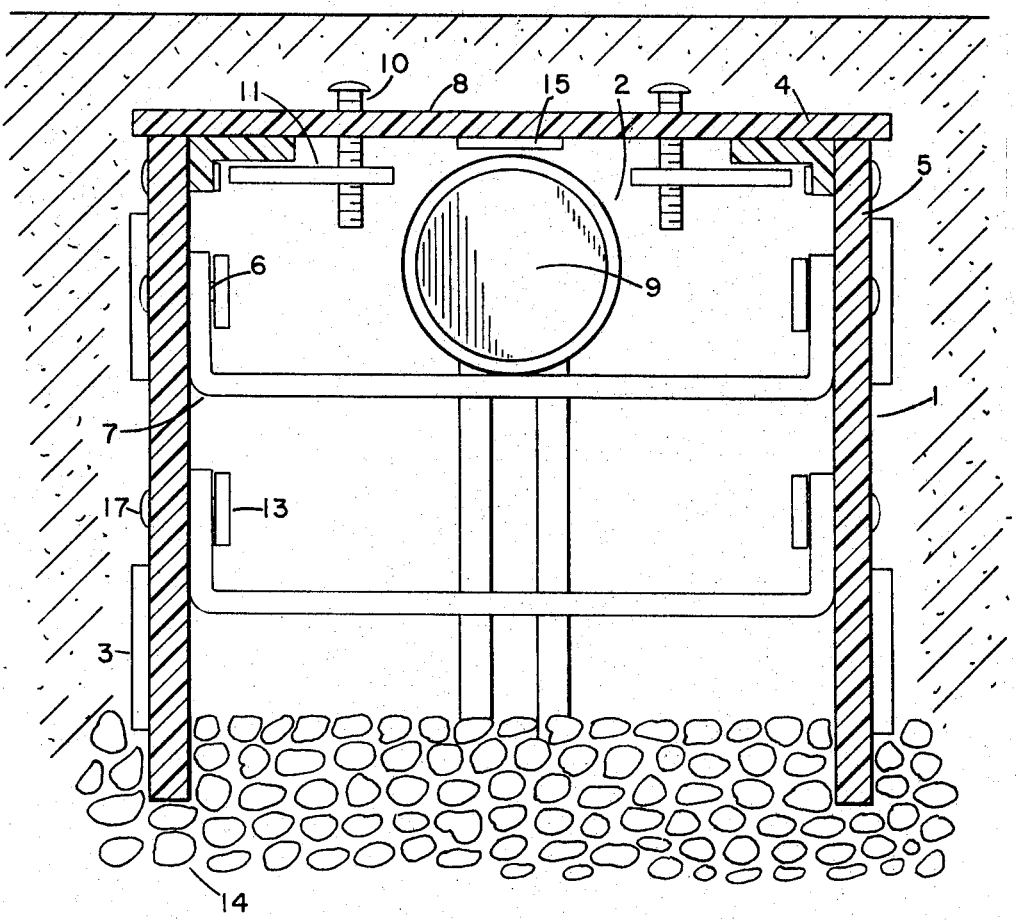
FIGURE 2 is a cross section of the prospective view shown in FIGURE 1 showing end walls, side walls, and spacer bars supporting the splice case.
Figure 4:
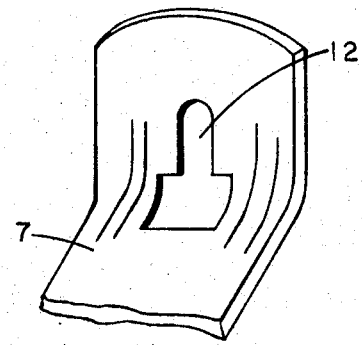
FIGURE 4 is a prospective view of a portion of a spacer bar showing an elongated aperture, adapted for connection with a stub.

Turning to FIGURE 2, these U-spacer bars are shown as elements 7. Also note FIGURE 4 where only a terminal portion of a U-shaped spacer bar is shown, this figure showing as well the elongated aperture 12. This aperture has a first and second portion, the first portion being larger than the second, this second portion being adapted to fit over the head member 13 of metal stub 6. On the other hand, the small portion of aperture 12 is adapted to snugly fit over the shank portion of elongated stub member 6 and frictionally lock itself into place. Inasmuch as a part of the elongated stub member 6 is embedded or fixed in the longer legs of the side walls 5 in a manner so that they are juxtapositioned on these side walls to form a mirror image when spaced apart side walls are facing one another, the U-shaped spacer bars 7 with the terminal portions attached to opposite facing stub members by means of engagement in the apertures in the spacer bars provide the necessary structural rigidity. It will also be appreciated that the design characteristic of quick disassembly and assembly has been preserved as a result of this spacer bar feature. A sharp blow in an upward direction on the spacer bar will quickly slide the U-shaped spacer bar 7 upward so as to permit the larger portion of aperture 12 to come into alignment with stub head 13. Thus, there can be a sliding of the spacer bar 7 over stub head 13, this being a method to quickly disengage the spacer bar 7 from the side walls 5.

Focusing attention on FIGURE 2, the handhole or handvault is shown in cross section as it would ordinarily appear in service. As a general rule, the handhole is bottomless in the sense that no closure is provided for the bottom portion of the handhole like top 8. In installing one of the instant handholes, a hole is dug in the earth sometimes just deep enough to cause the uppermost surface of top 8 to be flush with the surface of the ground. However, this hole can be slightly deeper so as to provide for a first layer of pea-size gravel to be placed in the bottom of the hole before placing the handhole in the ground. Not only can the instant handhole be flush with the ground surface, it also can be below grade. Furthermore, a layer of gravel can be placed inside the handhole so as to partially fill the volume therein.

Where the handhole is placed below grade, i.e. below the surface of the ground, just such an embodiment creates a problem of relocating the handhole whenever it is desired to have access to whatever is housed by it. Such a problem and its quick and easy solution is within the scope of this invention and the means used to solve this problem is either a ferrite magnet shown in 15 or in the preferred alternative, a low level but detectable radioactive mass. This magnet 15, although shown attached to the top 8 can obviously be attached to any side or end walls 2 or 5 with equal facility and effect. It is also contemplated by the instant invention to secure an encased low level but easily detectable radio active mass to the handhole, either on the inner or outer surface thereof. Hence, depending on whether one uses a magnetic, radioactive means, or mixtures thereof, a magnetometer or radiation detecting means can be used by subsequent workers to locate a buried handhole. Thus, in partial summary, the in-service handhole as is shown in FIGURE 2 can be installed so that its top is either flush with the ground—in which case generally no particular locating means is used because visual means are commonly sufficient—or the handhole is placed beneath grade and out of sight—in which case there is attached thereto in some fashion and in some place (generally on the innersurface of the handhole) a magnetic means or radioactive mass so that either a magnetometer, Geiger and/or sintillator counter can be employed by subsequent workmen to locate the handhole.

The pea-sized gravel, shown at 14 in FIGURE 2, is preferred but not necessarily obligatory. It has, however, been found that this particular size gravel is more effective against rodents (especially gophers) in that this particular size gravel appears to discourage rodents from burrowing into the inside of the handhole. It might at this point be questioned or postulated as to why a bottom—made in and attached in a manner like that of top 8—is not provided for the handhole. Such just a construction has been investigated and it has been found that a completely enclosed handhole acts like and is a buoyant object when placed underground. Thus, it behaves much like a buried fuel oil tank in that it has propensity to "float" itself right out of the ground when wet weather is encountered. Consequently, an open bottomed handhole is preferred for the foregoing reasons.

Again, focusing attention on FIGURE 2, attention is drawn to top 8, which is alternatively shown in FIGURE 1. This top has a bolt means 10 threaded onto a fastening means 11, the latter being a piece of metal, usually aluminum, with a threaded hole, one leg of the metal piece being longer than the distance between the bolt 10 and side wall 5. Such an arrangement provides that when the top is supported by end wall 2 and side wall 5 terminal edges, the top can be secured by rotating bolt member 10. Not only does this rotation of the bolt draw the metal member 11 in an upward direction so as to bring it into engagement with the shorter leg 4 of the side wall, but it also rotates by means of friction the longer portion of metal member 11 so that it is jammed against side wall 5. Upon further tightening of bolt 10, the uppermost surface of metal member 11 securely engages the lowermost surface of shorter leg 4 of the side walls. Thus, in this manner the top 8 is made secure.

As it already has been explained how the spacer bars 7 are secured to side walls 5, no further explanation is necessary; however, it is sufficient to note that preferably but not obligatory, two tiers of spacer bars 7 are positioned on their respective stub means (6 and 13) which are in turn secured to the side walls 5 as shown in FIGURE 2. Accordingly, the splice case 9, i.e. the item sought to be housed by the handhole, is generally but not always disposed on the uppermost tier of spacer bars 7 as shown. This is done for two reasons:

(a) to prevent, if possible, contact of splice case 9 with any water that may come through the pea-size gravel into the bottom of the handhole, and, (b) inasmuch as the splice case 9 has at least two cables protruding therefrom in a downwardly direction into and through the pea-size gravel 14 and out through and into the surrounding soil, it is beneficial to have the cable length from its entrance into the splice case to the uppermost surface of the pea-size gravel 14 to facilitate the bending of the cable and the easy manipulation of the splice case 9.

Maneuverability of the splice case is an important feature, which presents a great advantage to a subsequent workman when working on the connections of electrical conductors inside of the splice case 9 itself. As suggested by FIGURE 1, the splice case 9 can be lifted to the vertical position employing the exposed flexible cable length previously mentioned. When the splice case 9 is in a vertical position, it can be temporarily fixedly secured in this accessible position by a holding means (not shown). This holding means forms the subject matter of a copending application and forms no part of the instant invention. When repair work is finished on the splice case itself or an the electrical connectors inside of the splice case, the splice case is then lowered in the manner shown in FIGURE 1, the top 8 secured in the manner described and the handhole either covered with soil to bury same or the top 8 is left flush with the surface of the ground, whichever the case may be.

As a matter of detail description, the spacer bars 7 generally are constructed of metal and preferably of aluminum. However, it is within the scope of this invention for these space bars to be molded from any of the well known plastics, either thermosetting or thermoplastic. In like manner, the studs 6 and 13, 10 and top securing means 11 are generally constructed of metal preferably aluminum, but here again these can be molded out of any well known plastics either thermoplastic or thermosetting. In addition, shorter leg 4 of the side wall 5 can be a metal angle, preferably an aluminum one, one leg of which is secured to the terminal portion of side wall leg 5.

Figure 5:
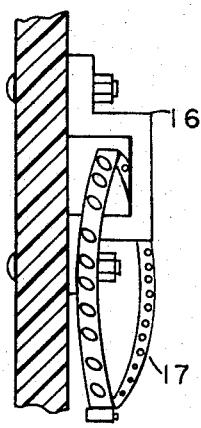
FIGURE 5 is a cross section along 5—5 of FIGURE 3 showing in detail how the adjustable clamps are attached to the end walls.

FIGURES 3 and 5 show respectively an elevation and cross-sectional view of one of the end walls. Bracket holder 16 forms an enclosure, in which a band or loop clamp 17 is disposed. This combination of clamp 17 and bracket holder 16 serves to secure the cables that are connected inside splice case 9 to one of the end walls 2 and positions the cables inside the handhole for neatness and to permit easy access and manipulation of splice case 9 by means of a predetermined segment of cable. Generally speaking, elements 16 are metal, preferably aluminum, whereas loop clamp means 17 are also preferably metal in construction. However, element 16 can be molded of a plastic either thermosetting or thermoplastic.

One of the great advantages of the disclosed handhole is its knockdown characteristic. Such characteristic permits a minimum of occupied volume during shipment and transport and when this feature is coupled with the ease one man is able to assemble the instant handhole at the job site, the advantages of this novel structure is significant. This significance is emphasized further when it is realized that the all-plastic (glass fiber reinforced plastic) or plastic plus aluminum construction is extremely light weight and easy to transport in the field under service installation conditions. But, there is no sacrificing of structural strength as evidenced by subjecting the installed handhole to the dynamic and static load of a loaded tractor trailer commercial truck with no damage to the handhole. Another added feature—employed mainly when the handhole is placed in service beneath grade—is the magnetic or radioactive means attached to the handhole. Such is used so as to facilitate the relocation of the handhole when buried below grade by means of either a magnetometer, Geiger and/or sintillator. Within the scope of knockdown characteristic or easy assembly nature, reference is made to stud member 6 and 13. This stud member has a flat-headed portiton integral with an elongated part. The flat-head portion is indicated by 13 and the elongated part shown at 6. Holes are drilled into the side wall 5 of a diameter of a size so as to easily receive the elongated member 6. Since elongated member 6 is integral with flat head 13, the flat head 13 can be automatically spaced apart from the innermost surface of side wall 5 by a simple location of the elongated member 6 within the side wall 5. There is a hole in elongated member 6 that is threaded. This threaded hole is adapted to receive a flat-headed bolt 17, which is screwed down so that the undersurface of said bolt is in flush engagement with the outermost surface of the longer leg of side wall 5. This bolt 17 then secures the stud 6 and 13 to the side wall 5.

From the foregoing, it is believed that the invention may be readily understood by those skilled in the art without further description, it being borne in mind that numerous changes may be made in the details disclosed without departing from the spirit of the invention.

I claim:
1. A four-sided container adapted to maintain an opening in the ground comprising the following in rectilinear assembled relationship:
 (a) two end walls possessing tab-like protrusions on at least two terminal edges thereof, said end walls being disposed in a spaced apart facing relationship;
 (b) two L-shaped side walls, one leg being longer than the other leg, the longer leg possessing elongated apertures in the terminal portions thereof, and said apertures engagingly receiving the tab-like portions of the end wall;
 (c) a plurality of elongated members having heads on a terminal portion thereof, said heads having a cross section greater than the elongated members, and a first portion of said elongated members being fixedly attached to the longer leg of the side walls, a second portion adjacent the head of the elongated members protruding from the side wall so that the head portions of the elongated members are spaced apart from the innermost surface of the longer side wall, and in addition, said head members being juxtapositioned in a mirror-like relationship on like opposing side walls;
 (d) a plurality of U-spacer bars possessing at least one elongated aperture therein, said aperture being removedly engaged with that second portion of the elongated members protruding from the innermost surface of the longer leg of the side wall.

2. A five-sided container wherein a top is secured to the four-sided container of claim 1 by means of a clamping means that are removably attached to said top, said clamping means engaging the innermost surface of the shorter leg of the side wall thereby bringing into secured contact said top with some of the terminal edges of both the side and end walls.

3. A five-sided container as described in claim 2 wherein a locating means is fixedly attached to an innersurface of said five-sided container, said locating means composed of substances selected from the group consisting of magnetic and radioactive materials as well as mixtures thereof.

4. A four-sided container as defined in claim 1 wherein at least one end wall thereof has attached to it at least one clamping means adapted to secure flexible cable in a predetermined position.

References Cited

UNITED STATES PATENTS

| 1,210,197 | 12/1916 | O'Connor | 220—3.94 X |
| 1,402,769 | 1/1922 | Hirshfeld | 220—3.94 |
| 3,055,970 | 9/1962 | Handley | 174—37 |

LARAMIE E. ASKIN, Primary Examiner

U.S. Cl. X.R.

174—52; 220—3.94